INVENTORS
HERBERT W. HOEPTNER
REXFORD H. OSBORN
ATTORNEY

OXIDIZER   FUEL

ZONE A

INVENTORS
HERBERT W HOEPTNER
REXFORD H OSBORN
ATTORNEY

INVENTORS
HERBERT W. HOEPTNER
REXFORD H. OSBORN
ATTORNEY

United States Patent Office 3,334,490
Patented Aug. 8, 1967

3,334,490
LIQUID ENGINE INJECTOR
Herbert W. Hoeptner and Rexford H. Osborn, San Jose, Calif., assignors to United Aircraft Corporation, East Hartford, Conn., a corporation of Delaware
Filed Nov. 4, 1964, Ser. No. 408,854
5 Claims. (Cl. 60—258)

The present invention relates to a liquid rocket injector and more particularly to an injector having a unique injection port pattern.

In order to achieve a high level of performance and stability, a liquid engine injector must be designed to ensure complete propellant mixing to promote high combustion temperatures and combustion efficiency. However, liquid rocket engines have been persistently plagued with problems of combustion instability and actual performance levels substantially below that of theoretical. The present invention, however, provides an injector wherein the injection ports are arranged in a unique pattern to produce an exceptionally efficient rocket motor over a wide range of mixture ratios. In addition, this injector design allows combustion chamber temperatures of 5000° F. and more without encountering serious degradation of the combustion chamber walls.

It is an object, therefore, of the present invention to provide a new and improved injector for liquid propulsion engines.

It is another object of the present invention to provide an injector for liquid propulsion motors that will provide high performance without combustion instability.

It is still a further object of the present invention to provide a liquid engine injector which will minimize char and ablation of the combustion chamber.

These together with the various ancillary objects and features of the invention are realized by employing an injector design made in accordance with the teachings as hereinbelow set forth in detail and illustrated in the accompanying drawings wherein.

Figure 1:
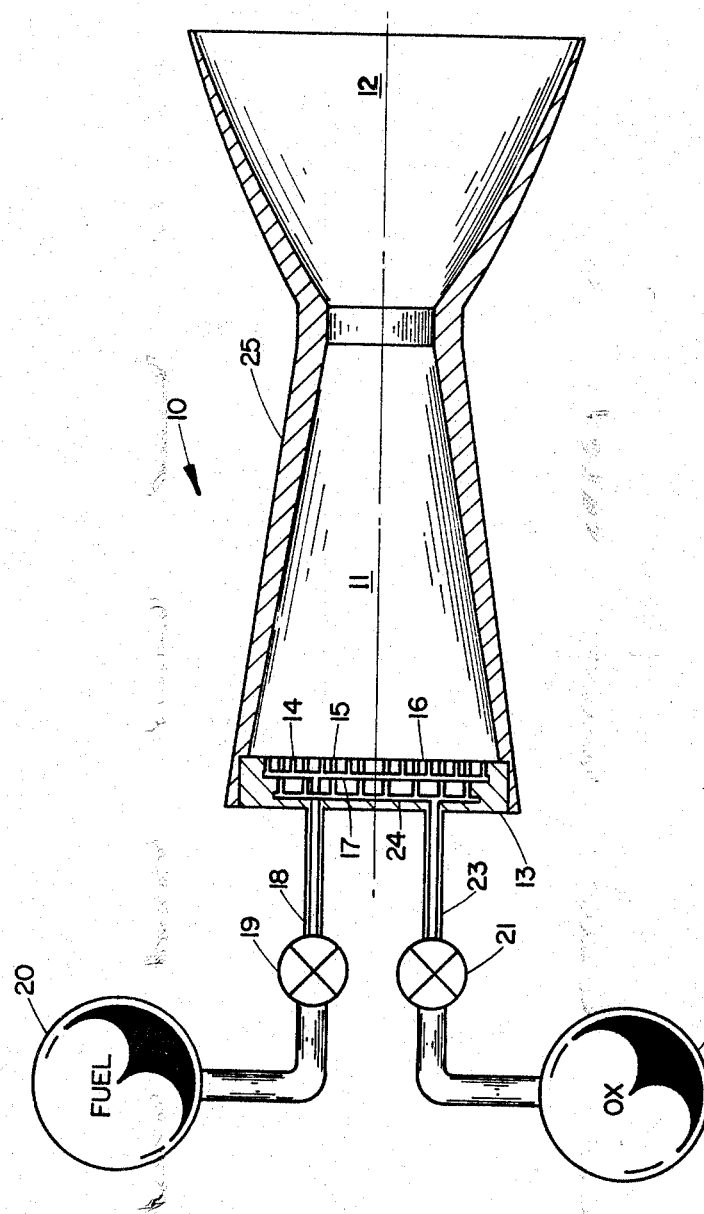
FIG. 1 illustrates in cross-section a typical liquid rocket engine.

Referring now to FIG. 1, 10 is a typical liquid rocket engine system having a combustion chamber 11 and a nozzle 12. At the head end of the combustion chamber is an injector unit 13 containing fluid emission holes 14 and 15 for the injection of fuel and oxidizer, respectively, into the combustion chamber. Fluid emission holes 14 on the injector face 16 are fed by a common conduit 17 which in turn is in fluid communication with supply conduit 18. By opening valve 19, fuel contained in tank 20 passes through the valve into conduit 18 then into supply conduit 17 and out holes or ports 14 into the combustion chamber 11. Similarly, by opening valve 21, oxidizer contained in 22 passes through supply line 23 and into conduit 24 and out oxidizer injection ports 15 into the combustion chamber 11. If the fuel and oxidizer contained in tanks 20 and 22, respectively, are hypergolic, ignition will take place spontaneously upon contact of the respective fluids. However, in the event the propellants are not hypergolic, appropriate ignition means, not shown, may be used.

However, such prior art motors have been faced with a number of problems such as combustion instability and deterioration of combustion chamber walls 25 by virtue of the high temperatures produced in the combustion chamber 11. The unique injector design of the present invention, however, results in unusually high motor performance and combustion efficiency while eliminating combustion instability and minimizing the tendency of the combustion fireball in chamber 11 to seriously deteriorate wall 25.

Figure 2:
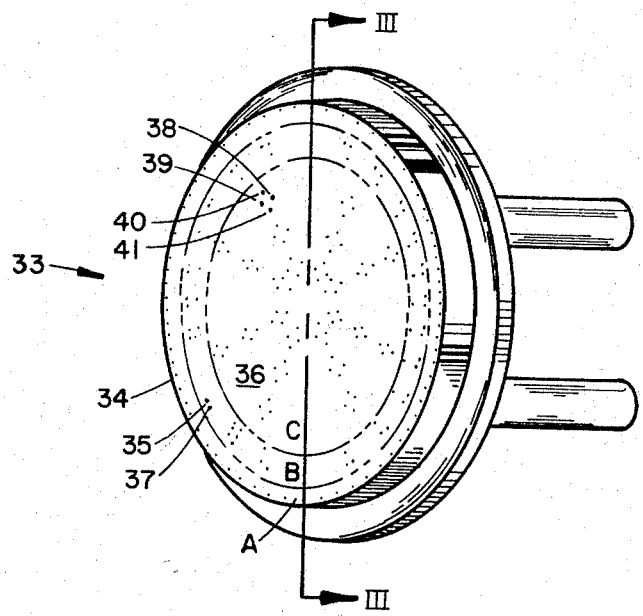
FIG. 2 is a plan view of the face of the injector of the present invention.

The unique injector employing the special design of the present invention is shown in FIG. 2. Basically, the injector is comprised of three regions A, B and C wherein three distinct types of injection orifices are located on injector face 36. The outermost region, area A, contains a plurality of injection orifices 34 which are substantially normal to the injector face 36. All injection orifices 34 are connected to a common propellant feed line whereby only one of the propellants is injected at this outer perimeter of the injector.

In the next area inwardly, area B, are located a series of injection ports 35 and 37 for the injection fuel and oxidizer. As will be shown in further detail in FIG. 6, these injection ports are substantially parallel to one another and normal to the injector face 36 whereby propellant streams emanating from ports 35 and 37 do not combine until substantial penetration into the combustion chamber 11 is effected. At this point, the propellants eventually mix and react to form high-temperature combustion products.

Figure 8:
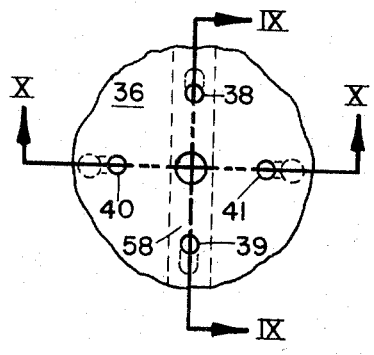
FIG. 8 is a fragmentary plan view of zone C of the injector of FIG. 2.
Figure 9:
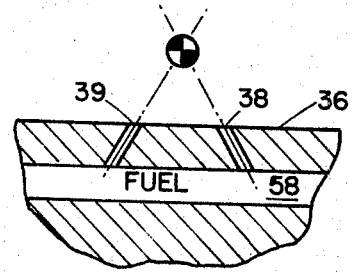
FIG. 9 is a fragmentary sectional view taken about line IX—IX of FIG. 8.
Figure 10:
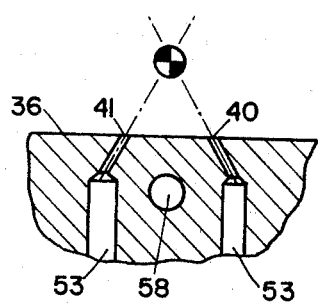
FIG. 10 is a fragmentary sectional view about line X—X of FIG. 8.

The central region, C, comprises the bulk of the injector face and contains, for example, "duo-doublet" injection ports as shown in detail in FIGS. 8, 9 and 10. Orifices 38 and 39 inject one propellant, whereas ports 40 and 41 inject a second propellant. Ports 38, 39, 40 and 41 are at an angle to the injector face 36 such that the propellants emerging therefrom converge at a common point a short distance from the injector face creating a vigorous mixing action and causing immediate reaction. Although the "duo-doublet" configuration is preferred, any design permitting rapid mixing and efficient combustion of propellants will produce the desirable upstream coring effect of the present invention.

By this novel arrangement of three types of injection orifices in the three aforementioned areas, unusually efficient combustion takes place with a minimum of heating at the chamber walls although virtually no unreacted oxidizer or fuel species remain by the time the gases reach the nozzle. Assuming it is a fuel that is injected through ports 34, 35, 38 and 39 and an oxidizer injected through ports 37, 40 and 41, the fuel and oxidizer emerging from ports 38, 39, 40 and 41 will impinge a short distance from the injector face for immediate and vigorous reaction, thereby creating temperatures in the combustion chamber in excess of 5000° F. If no propellants were flowing out of ports 34, 35 and 37, the high-temperature fireball would soon heat the combustion chamber walls to the point of failure. However, because propellants are in fact emerging from ports 34, 35 and 37, the walls of the combustion chamber are buffered from the central core of high-temperature gases by means of two envelopes of relatively cool fluids in regions A and B. In region B, fuel is injected through port 35 and oxidizer through port 37, but because the injection orifices are substantially normal to the injector face 36, the propellant streams penetrate into the combustion chamber for a predetermined distance before mixing sufficiently to form high-temperature gaseous products. In the meantime, the liquid propellant streams and the low temperature combustion products initially formed create an envelope around the center fireball, thereby mitigating the aforementioned heating problem of the combustion chamber walls. In addition, the outer perimeter of the injector 33, area A, contains injection ports 34 for the admission of one propellant, only, namely fuel in the present example whereby the fuel penetrates for a substantial distance into the combustion chamber before meeting oxidizer species for combustion. As a result, a secondary envelope is created about the first envelope which was generated downstream of the injector surface B. By this double enveloping effect about the center fireball, the firewalls of the combustion chamber are insulated to a high degree from the extremely high-temperature central core of gases and, as a result, the combustion chamber walls enjoy an extended firing time life. It has been found that with an injector of the present invention, ablative combustion chambers can withstand central combustion zone temperatures of approximately 5200° F. for over 500 seconds at chamber pressures of over 100 pounds per square inch while operating at extremely high efficiencies.

Figure 3:
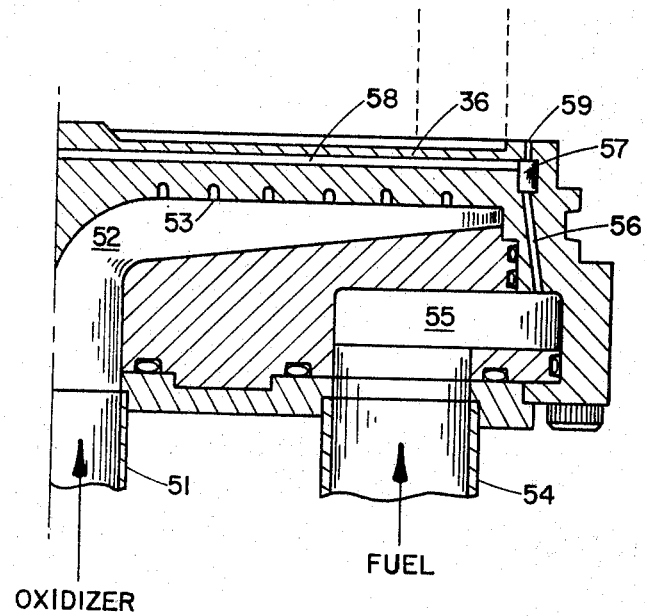
FIG. 3 is a half-sectional view taken along lines III—III in FIG. 2.

To effect injector face cooling and to create substantially equal pressurization of all injection ports, internal channeling such as that shown in FIG. 3 is preferred for the present invention. Here it is shown that the oxidizer enters supply conduit 51 and passes into the flat circular shaped chamber 52 having a reduced thickness at its outer reaches. In this way, pressure will be maintained relatively constant at all oxidizer injection ports found in regions C and B as discussed above. The oxidizer injector orifices, not shown in FIG. 3, connect to feed lines 53. Fuel is provided to the injector through supply conduit 54 which feeds into toroidal channel 55, then into conduit 56 and up to toroidal channel 57 and finally into lateral distribution passages 58. The injection ports for fuel in regions B and C tap into the lateral distribution passages 58 which are arranged in a spokelike manner about the injector. The fuel injected in region A comes from port 59 which connects directly to annular channel 57. The injection port 59 found in the outer area A is shown in greater detail in FIG. 4 with toroidal cavity 55 providing fuel to a number of conduits 56.

Figure 4:
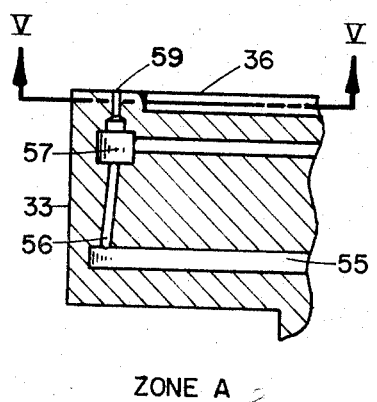
FIG. 4 is a fragmentary sectional view of zone A of the injector of FIG. 2.
Figure 5:
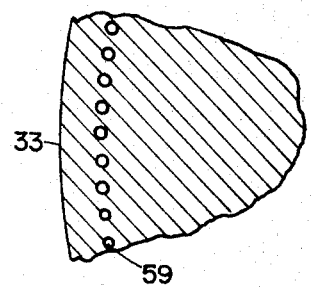
FIG. 5 is a fragmentary sectional view taken about the line V—V of FIG. 4.

FIG. 5 shows a fragmentary sectional view along section lines V—V of FIG. 4, which illustrates more clearly the relative position of the various injection ports 59 located on the outer perimeter of injector 33. It is shown here that only one row of injector ports for the fuel is provided, but it is feasible to provide several rows of fuel injection ports in the event greater containment by the primary-envelope is desired.

Figure 6:
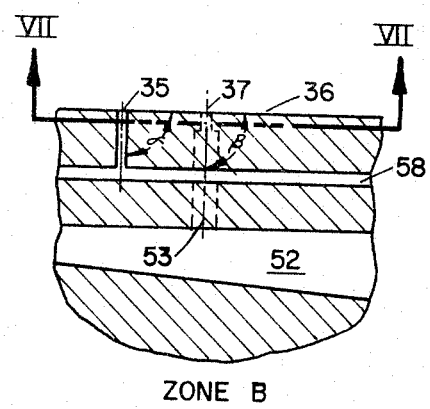
FIG. 6 is a fragmentary sectional view of zone B of the injector of FIG. 2.

FIG. 6 is a fragmentary sectional view of area B showing in detail the internal ducting leading to fuel and oxidizer injection ports 35 and 37. Here the fuel enters into region B by means of lateral port 58 which then travels to injection port 35 at the injector face. Oxidizer, located in annular chamber 52 passes into conduit 53 to the surface of the injector and out port 37 at the face thereof. It will be noted that the injection ports 35 and 37 are at angles α and β, respectively, to the injector surface 36. Although it is preferred that α and β be 90° so that ports 35 and 37 are perependicular to the injector face and parallel to one another, other angles may be used, for example, if the combustion chamber walls are converging towards the nozzle throat, then it is preferred to have angles α and β substantially identical to the angle of the combustion chamber wall with the center axis of the motor. In this way, the propellant streams will be substantially parallel to one another and to the walls of the combustion chamber.

Figure 7:
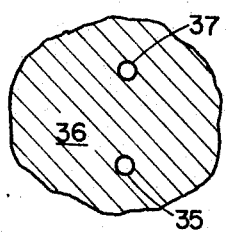
FIG. 7 is a fragmentary sectional view taken about line VII—VII of FIG. 6.

FIG. 7 shows FIG. 6 in cross-section at VII—VII just below injector face 37 in area B. Here the injection ports 35 and 37 are shown to be substantially normal to the injector surface 36 and parallel to one another.

FIG. 8 is a fragmentary plan view of the duo-doublet injection port design in region C. Here fuel provided by radial passage 58 is injected into the combustion chamber by means of ports 38 and 39. As shown in FIG. 9, ports 38 and 39 are at an angle to one another whereupon fluids therefrom converge at a point a predetermined distance above the injector face 36. As shown in FIG. 8, the oxidizer is injected into the combustion chamber by means of ports 40 and 41 which, as shown in FIG. 10, are likewise canted at a predetermined angle to permit convergence at a predetermined distance above the injector face 36 which is, preferably, identical to the predetermined distance at which the fuel from ports 39 and 38 converge. At this point of common convergence of the fuel and oxidizer, thorough mixing of the two propellants occurs and efficient high-temperature combustion ensues. The greater portion of the injector surface 36 contains the duo-doublets of FIGS. 8, 9 and 10. This configuration produces extremely efficient combustion and highest attainable temperatures for the propellants involved. Up to approximately 90 percent of the consumption of the propellants takes place through duo-doublet injector ports with the remaining 10 percent or more of the propellants entering through the injection ports of regions A and B. It is clear, of course, that these ratios may be altered to conform with specific geometry of the rocket motor 10, the physical and chemical characteristics of the propellants used, and the pressures under which the fuel and oxidizer are forced into the combustion chamber.

It will be obvious to one skilled in the art that a wide variety of variations may be incorporated into the basic design of the present invention. Namely, injection ports of different physical geometery or different spacing may be utilized and still produce the high-efficiency, high-temperature, center fireball while maintaining a first envelope of lower temperature combustion products, and a second outer envelope of still lower temperature combustion products. Accordingly, it is to be understood that the specific embodiments of the invention herein disclosed are of a descriptive rather than a limiting nature, and that various changes, combinations, substitutions or modifications may be employed in accordance with these teachings without departing either in spirit or scope from this invention in its broader aspects.

We claim:
1. A liquid rocket engine injector for injecting first and second liquid constituents comprising an injector face having first means at the outer perimeter for injecting said first liquid constituents, second means located inwardly over a predetermined distance from said outer perimeter for injecting said first and second liquid constituents in substantially parallel streams, and third means located inwardly of said second means covering the balance of said injector face for injecting said first and second liquid constituents in a convergent manner whereby they impinge at a predetermined distance from the point of injection.

2. A liquid rocket engine injector comprised of a body having a combustion-zone face, first inlet and first outlet means for a first fluid, second inlet and second outlet means for a second fluid and all of said outlet means arranged in first, second and third substantially concentric areas on said combustion zoned face, said first area having a plurality of outlet means for said first fluid which are substantially parallel to one another, said second area having a plurality of pairs of said first and second outlet means, said first and second outlet means being substantially parallel to one another and said third area having a plurality of said first and second outlet means converging toward one another whereby impingement of said first fluid and second fluid occurs at a predetermined distance from the injector face, said third area covering the central surfaces of said combustion zone injector face, said second area surrounding said third area and said first area surrounding said second area.

3. A liquid rocket engine injector as in claim 2 further comprising a combustion chamber wall intersecting said combustion zone face at a predetermined angle, and the first outlet means and the second outlet means in the second area are at an angle to the combustion zone face which is substantially identical to said predetermined angle.

4. A liquid rocket engine injector as in claim 2 wherein the first and second outlet means in said third area are arranged in groups of four about a central point on the injector face wherein said first outlet means are positioned at points 180° apart about said point and at an angle to the injector face whereby impingement of the first fluid occurs at a predetermined distance above the injector face directly above said point and said second outlet means are located as a pair 90 degrees from said first outlet means and 180 degrees from each other and at an angle to said injector face whereby said second fluid emerging therefrom impinges at a predetermined distance above the injector face directly above said point.

5. A liquid rocket engine injector as in claim 2 wherein impingement of said first fluid and the impingement of said second fluid occurs at substantially the same distance above the injector face.

References Cited
UNITED STATES PATENTS

| | | | |
|---|---|---|---|
| 2,763,987 | 9/1956 | Kretschmer | 60—35.6 |
| 3,000,184 | 9/1961 | Fish | 60—39.74 |
| 3,200,589 | 8/1965 | Mower et al. | 60—39.74 |

MARK NEWMAN, *Primary Examiner.*

D. HART, *Assistant Examiner.*